(12) United States Patent
Zheng et al.

(10) Patent No.: US 11,983,036 B2
(45) Date of Patent: May 14, 2024

(54) WEARABLE DEVICE AND DISPLAY METHOD

(71) Applicant: VIVO MOBILE COMMUNICATION CO., LTD., Guangdong (CN)

(72) Inventors: Caiyin Zheng, Guangdong (CN); Zhiwen Gao, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 92 days.

(21) Appl. No.: 17/692,507

(22) Filed: Mar. 11, 2022

(65) Prior Publication Data

US 2022/0197334 A1  Jun. 23, 2022

Related U.S. Application Data

(63) Continuation of application No. PCT/CN2020/106255, filed on Jul. 31, 2020.

(30) Foreign Application Priority Data

Sep. 23, 2019 (CN) .......................... 201910900553.5

(51) Int. Cl.
*G06F 1/16* (2006.01)
(52) U.S. Cl.
CPC ............ *G06F 1/163* (2013.01); *G06F 1/1686* (2013.01); *G06F 2200/1614* (2013.01)
(58) Field of Classification Search
CPC ........ G04B 47/00; G04B 19/22; G04C 3/002; G04G 17/04; G04G 9/00; G04G 17/06; G04G 21/00
See application file for complete search history.

(56) References Cited

U.S. PATENT DOCUMENTS

| 5,572,489 | A | 11/1996 | Born et al. |
| 10,067,479 | B2 * | 9/2018 | Yu .......................... G04G 17/06 |

(Continued)

FOREIGN PATENT DOCUMENTS

| CN | 1144351 A | 3/1997 |
| CN | 101017743 A | 8/2007 |

(Continued)

OTHER PUBLICATIONS

The First Office Action of Priority Application No. CN 201910900553.5 issued by the Chinese Patent Office on Sep. 14, 2020.

(Continued)

*Primary Examiner* — Edwin A. Leon
(74) *Attorney, Agent, or Firm* — IP & T GROUP LLP

(57) ABSTRACT

A wearable device includes a dial, a watch body, and a position detection member. The position detection member includes a first component and a second component, one of the first component and the second component is arranged on the dial, the other of the first component and the second component is arranged on the watch body. The first component includes a first subcomponent and a second subcomponent, and the first subcomponent and the second subcomponent are spaced from each other in a rotation direction of the watch body. The position detection member has a first state and a second state, when the position detection member is in the first state, the first subcomponent is opposite to the second component, and when the position detection member is in the second state, the second subcomponent is opposite to the second component.

20 Claims, 10 Drawing Sheets

(56) References Cited

U.S. PATENT DOCUMENTS

| | | | |
|---|---|---|---|
| 10,274,905 B2 | 4/2019 | Chung | |
| 2007/0140454 A1 | 6/2007 | Ito | |
| 2012/0092029 A1 | 4/2012 | Precht | |
| 2013/0271119 A1 | 10/2013 | Backes et al. | |
| 2015/0015277 A1 | 1/2015 | Forrer et al. | |
| 2017/0277125 A1* | 9/2017 | Jung | G04G 21/00 |
| 2018/0052426 A1 | 2/2018 | Ferri et al. | |

FOREIGN PATENT DOCUMENTS

| | | |
|---|---|---|
| CN | 201830328 U | 5/2011 |
| CN | 202255277 U | 5/2012 |
| CN | 102830385 A | 12/2012 |
| CN | 103124896 A | 5/2013 |
| CN | 104280053 A | 1/2015 |
| CN | 204301682 U | 4/2015 |
| CN | 105049570 A | 11/2015 |
| CN | 106060369 A | 10/2016 |
| CN | 205809552 U | 12/2016 |
| CN | 206099663 U | 4/2017 |
| CN | 106662841 A | 5/2017 |
| CN | 207780510 U | 8/2018 |
| CN | 207976717 U | 10/2018 |
| CN | 109725711 A | 5/2019 |
| CN | 110716417 A | 1/2020 |
| JP | 2002-174688 A | 6/2002 |

OTHER PUBLICATIONS

International Search Report and Written Opinion of International Application No. PCT/CN2020/106255 issued by the Chinese Patent Office on Oct. 14, 2020.

* cited by examiner

WEARABLE DEVICE AND DISPLAY METHOD

CROSS-REFERENCE OF RELATED APPLICATIONS

This application is a Bypass Continuation Application of PCT/CN2020/106255 filed on Jul. 31, 2020, which claims priority to Chinese Patent Application No. 201910900553.5 filed on Sep. 23, 2019, which are incorporated herein by reference in their entirety.

TECHNICAL FIELD

The present disclosure relates to the technical field of clocks and watches, and in particular, to a wearable device and a display method.

BACKGROUND

With popularization of wearable devices such as watches, people require not only for functions such as time reading, step counting, and positioning of wearable devices, but also increasingly require for functions such as calls and taking pictures. Therefore, the design of functional components such as camera components is added to wearable devices to meet the requirements of shooting sceneries and selfies or video calls.

SUMMARY

According to a first aspect, a wearable device includes: a dial, where the dial is provided with a receiving groove; a watch body, at least partially arranged in the receiving groove and rotatably connected to the dial, where the watch body is provided with a functional component; and a position detection member, including a first component and a second component, where one of the first component and the second component is arranged on the dial, the other of the first component and the second component is arranged on the watch body, the first component includes a first subcomponent and a second subcomponent, and the first subcomponent and the second subcomponent are spaced from each other in a rotation direction of the watch body; where the position detection member has a first state and a second state, when the position detection member is in the first state, the first subcomponent is opposite to the second component, and when the position detection member is in the second state, the second subcomponent is opposite to the second component.

In the embodiments of the present disclosure, the functional component is disposed on the watch body and the watch body is rotatably connected to the dial, so that usage requirements of the functional component in different positions and states can be met, that is, shooting or other functional requirements of the wearable device at different viewing angles can be met. The correspondingly disposed position detection member can detect the position of the watch body relative to the dial according to the first state or the second state, which is more conducive to adjustment of the position of the functional component relative to the dial.

According to a second aspect, the embodiments of the present disclosure provide a display method, applied to a wearable device, where the wearable device includes a dial, a watch body, and a position detection member, the dial is provided with a receiving groove, the watch body is at least partially disposed in the receiving groove and rotatably connected to the dial, the watch body is provided with a display screen and a camera component, and the method includes: receiving first position information of the position detection member; and controlling a display direction of a display interface of the display screen according to the first position information.

In the embodiments of the present disclosure, the first position information of the position detection member is received; and the display direction of the display interface of the display screen is controlled according to the first position information. This can help ensure that the display direction of the display interface is always a direction that facilitates observation of the user, so that the user has better user experience.

According to a third aspect, the embodiments of the present disclosure provide a wearable device, where the wearable device includes a dial, a watch body, and a position detection member, the dial is provided with a receiving groove, the watch body is at least partially disposed in the receiving groove and rotatably connected to the dial, the watch body is provided with a display screen and a camera component, and the wearable device further includes: a receiving module, configured to receive first position information of the position detection member; and a control module, configured to control a display direction of a display interface of the display screen according to the first position information.

In the embodiments of the present disclosure, the wearable device is limited to include the receiving module and the control module, the receiving module is configured to receive first position information of the position detection member; and the control module is configured to control a display direction of a display interface of the display screen according to the first position information. This can help ensure that the display direction of the display interface is always a direction that facilitates observation of the user, so that the user has better user experience.

According to a fourth aspect, the embodiments of the present disclosure provide a wearable device, including a processor, a memory, and a computer program stored in the memory and executable on the processor, where when the computer program is executed by the processor, steps of any one of the foregoing display methods are implemented.

According to a fifth aspect, the embodiments of the present disclosure provide a non-transitory computer-readable storage medium, where the non-transitory computer-readable storage medium stores a computer program, and when the computer program is executed by a processor, steps of any one of the foregoing display methods are implemented.

According to a sixth aspect, the embodiments of the present disclosure provide a computer program product, where the computer program product is stored in a nonvolatile storage medium, and the computer program product is configured to be executed by at least one processor to implement steps of any one of the foregoing display methods.

According to a seventh aspect, the embodiments of the present disclosure provide a wearable device, where the wearable device is configured to implement any one of the foregoing display methods.

BRIEF DESCRIPTION OF DRAWINGS

The following describes features, advantages, and technical effects of the exemplary embodiments of the present disclosure with reference to the accompanying drawings.

Figure 1:
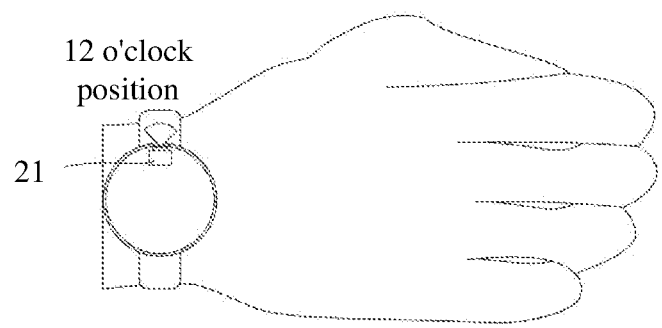
FIG. 1 is a schematic diagram of arrangement of a camera component in a wearable device.

where:

X-Rotation direction

10—dial; 11—receiving groove; 111—first side surface; 112—first bottom surface; 12—mounting slot; 13—limiting ball; 14—elastic member;

20—watch body; 21—camera component; 22—limiting slot; 23—first housing; 231—main body; 232—first protrusion portion; 232*a*—chamfer structure; 232*b*—chamfer surface; 233—second side surface; 234—second bottom surface; 24—display screen; 25—first accommodating cavity;

30—position detection member; 31—first component; 311—first subcomponent; 311*a*—first trigger block; 311*b*—first conductive subcomponent; 312—second subcomponent; 312*a*—second trigger block; 312*b*—second conductive subcomponent; 32—second component; 321—mounting body; 321*a*—first surface; 321*b*—second surface; 322—contact; 322*a*—first sub-contact; 322*b*—second sub-contact;

40—rotating connecting piece; 41—rotating guide rail; 42—guide component;

50—watch strap;

60—support component

70—gap;

400—control module; 410—determining unit; 420—first adjusting unit; 430—second adjusting unit; 431—determining subunit; 432—obtaining subunit; 433—adjusting subunit; 440—third adjusting unit;

500—wearable device; 501—radio frequency unit; 502—network module; 503—audio output unit; 504—input unit; 5041—graphics processing unit; 5042—microphone; 505—sensor; 506—display unit; 5061—display panel; 507—user input unit; 5071—touch panel; 5072—another input device; 508—interface unit; 509—memory; 510—processor; and 511—power supply.

In the drawings, the same components are marked by the same reference numerals. The drawings are not drawn to actual scale.

DETAILED DESCRIPTION OF THE EMBODIMENTS

Characteristics and exemplary embodiments of various aspects of the present disclosure are described below in detail. In the following detailed descriptions, many specific details are provided to thoroughly understand the present disclosure. However, it is very clear to a person skilled in the art that the present disclosure can be implemented without some of these specific details. The following descriptions of the embodiments merely intend to provide examples of the present disclosure to better understand the present disclosure. In the accompanying drawings and the following descriptions, at least some well-known structures and technologies are not shown to avoid unnecessary ambiguity of the present disclosure. Besides, for clarity, the sizes of some structures may be enlarged. In addition, the features, structures, or characteristics described below may be combined in one or more embodiments in any suitable manner.

The orientation words appearing in the following description are all the directions shown in the figures, and do not limit the specific structure of the wearable device and the display method of the present disclosure. In description of the present disclosure, it should be further noted that unless expressly stipulated and defined otherwise, the terms "mount" and "connect" should be understood in a broad sense. For example, "connection" may be a fixed connection, a detachable connection, or an integral connection; and may be a direct connection or an indirect connection. A person of ordinary skill in the art may understand specific meanings of the foregoing terms in the present disclosure based on a specific situation.

Figure 2:
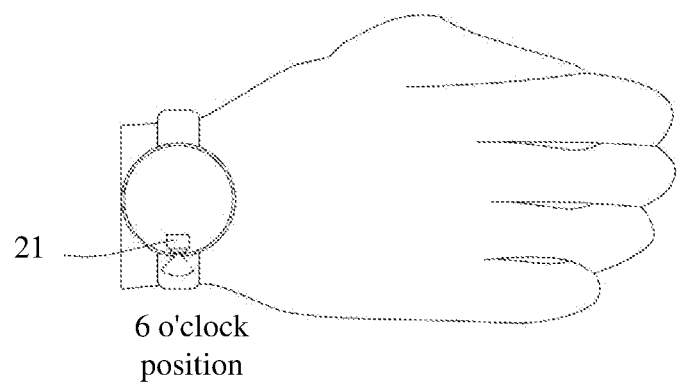
FIG. 2 is a schematic diagram of arrangement of a camera component in a wearable device.
Figure 3:
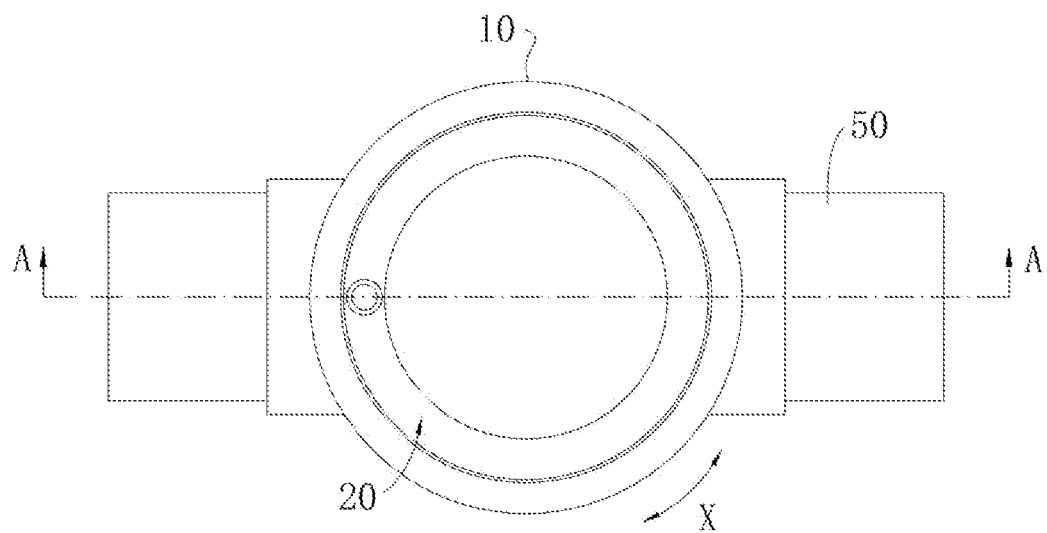
FIG. 3 is a top view of a wearable device according to an embodiment of the present disclosure.
Figure 4:
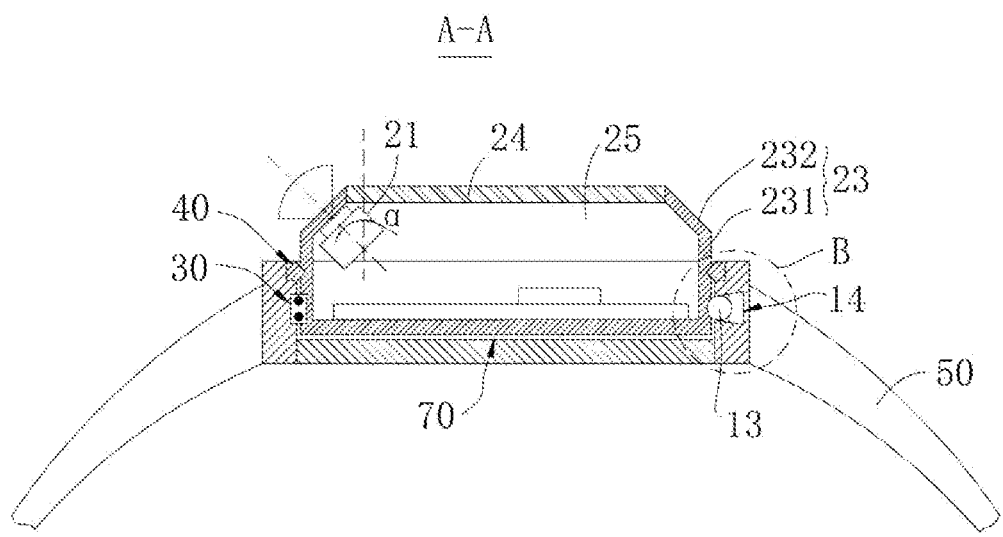
FIG. 4 is a cross-sectional view along a direction A-A in FIG. 3.
Figure 5:
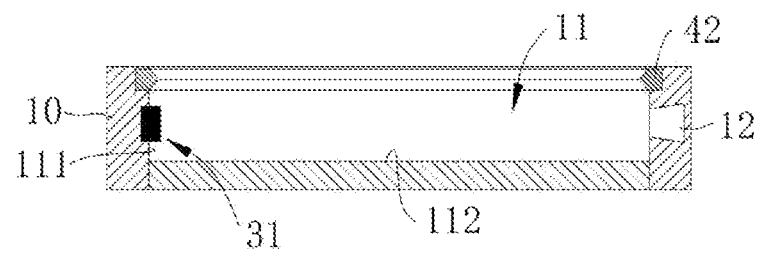
FIG. 5 is a schematic cross-sectional view of a dial according to an embodiment of the present disclosure.
Figure 6:
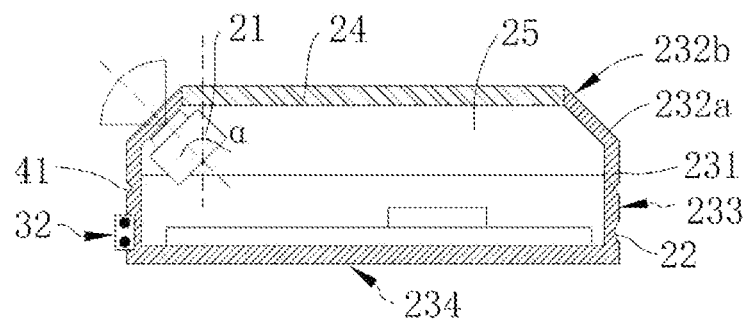
FIG. 6 is a schematic cross-sectional view of a watch body according to an embodiment of the present disclosure.

Generally, a wearable device with a camera function only has one camera due to space constraints. In this way, an external scenery and a selfie cannot be shot conveniently at the same time without removing the wearable device. As shown in FIG. 1, a camera component 21 is located at the upper end of the wearable device, that is, the 12 o'clock direction of the wearable device, and the shooting viewing angle faces upwards, which can be very convenient for shooting an external scenery. However, this arrangement is difficult to shoot a selfie. As shown in FIG. 2, if the camera component 21 is arranged at the lower end of the watch, that is, the 6 o'clock direction of the wearable device, and the shooting viewing angle faces downwards, it is very easy to take a selfie. However, this arrangement is difficult to shoot an external scenery. That is, the wearable device with a camera component or other functional components currently cannot achieve shooting at different viewing angles or other functional requirements, thereby failing to meet user requirements.

To better understand the present disclosure, a wearable device and a display method provided in the embodiments of the present disclosure will be described below in detail with reference to FIG. 3 to FIG. 21.

As shown in FIG. 3 to FIG. 6, the embodiments of the present disclosure provide a wearable device, including a dial 10, a watch body 20, and a position detection member 30, the dial 10 is provided with a receiving groove 11, the watch body 20 is at least partially disposed in the receiving groove 11 and rotatably connected to the dial 10, and the watch body 20 is provided with a functional component. The position detection member 30 includes a first component 31 and a second component 32, where one of the first component 31 and the second component 32 is arranged on the dial 10, the other of the first component 31 and the second component 32 is arranged on the watch body 20, the first component 31 includes a first subcomponent 311 and a second subcomponent 312, and the first subcomponent 311 and the second subcomponent 312 are spaced from each other in a rotation direction of the watch body 20. The position detection member 30 has a first state and a second state, when the position detection member 30 is in the first state, the first subcomponent 311 is opposite to the second component 32, and when the position detection member 30 is in the second state, the second subcomponent 312 is opposite to the second component 32.

In the wearable device provided in the embodiments of the present disclosure, the functional component is disposed on the watch body 20 and the watch body 20 is rotatably connected to the dial 10, so that usage requirements of the functional component in different positions and states can be met, that is, shooting or other functional requirements of the wearable device at different viewing angles can be met. The correspondingly disposed position detection member 30 can detect the rotation angle of the watch body 20 relative to the dial 10 according to the first state or the second state, which is more conducive to adjustment of the position of the functional component relative to the dial 10.

In some optional examples, the dial 10 as a whole may be a circular dial-shaped structure, and the receiving groove 11 may be formed by recessing one end surface of the dial 10 in its axial direction. A wall surface that encloses to form the receiving groove 11 includes a first side surface 111 and a first bottom surface 112, and the first side surface 111 is disposed around the first bottom surface 112.

The functional component mentioned above and below in the embodiments of the present disclosure can be in various forms, such as an earpiece, a microphone, a flashlight, an infrared component, or a camera component 21. To facilitate understanding of the present disclosure, for example, the functional component includes a camera component 21 below.

In some optional examples, the watch body 20 may include a display screen 24 and a first housing 23. The display screen 24 is arranged on a side of the first housing 23 away from the dial 10, and the functional component is arranged on a side of the watch body 20 away from the dial 10. The display screen 24 and the first housing 23 jointly form a first accommodating cavity 25, and the watch body 20 can be inserted into the receiving groove 11 of the dial 10 through the first housing 23 and is rotatably connected to the dial 10. The watch body 20 uses the above form and has a simple structure. The arrangement of the first housing 23 and the display screen 24 enable the wearable device to have a display function while enabling the watch body 20 to be rotatably connected to the dial 10.

As an optional implementation, the first housing 23 has a main body portion 231 arranged in the receiving groove 11 and a first protruding portion 232 arranged outside the receiving groove 11, and the display screen 24 and the functional component are both arranged on the first protruding portion 232. Through the above arrangement, the watch body 20 can be rotatably connected to the dial 10, and when the watch body 20 rotates to a predetermined position, the position is locked. At the same time, the arrangement of the first protrusion portion 232 better helps the user to hold and twist the first protrusion portion 232, so that the watch body 20 rotates relative to the dial 10 as a whole.

In some optional examples, the first protrusion portion 232 has a chamfer structure 232a, and a cross-sectional area of the first protrusion portion 232 gradually decreases in a direction from an end of the first protrusion portion 232 proximate to the dial 10 to an end of the first protrusion portion 232 away from the dial 10. Through the above arrangement, the overall aesthetics of the wearable device can be improved, and the user can hold the first protrusion portion 232 more comfortably.

Optionally, the chamfer structure 232a includes a chamfer surface 232b arranged around the display screen 24. Still for example, the functional component includes a camera component 21. The camera component 21 is connected to the chamfer structure 232a and the lens of the camera component 21 faces the chamfer surface 232b, and an angle α between a shooting direction of the camera component 21 and a normal direction of a plane of the display screen 24 is any value from 30° to 60° and includes 30° and 60°. The above angle setting makes it easier for the user to see the picture on the display screen 24 no matter when the camera component 21 shoots a selfie or an external scenery.

Optionally, the angle α between the shooting direction of the camera component 21 and the normal direction of the plane of the display screen 24 is an arbitrary value between 40° and 50°. In this value range, when the wearable device is worn on the wrist of the user, it can ensure that the user's arm posture can satisfy the ergonomics no matter when the user shoots an external scenery or a selfie, and ensure the user's comfort in different shooting functions. Furthermore, optionally, the angle α between the shooting direction of the camera component 21 and the normal direction of the plane of the display screen 24 is 45°. This angle value can ensure the user's shooting comfort, and ensure that the user has a better viewing angle of the shot object displayed on the display screen 24 during the shooting process.

It may be understood that the above various embodiments of the present disclosure provide a wearable device, and the position detection member 30 may have a variety of structural forms and is mainly configured to detect the relative positions of the watch body 20 and the dial 10, for example, a rotation angle of the watch body 20 relative to the dial 10.

Figure 7:
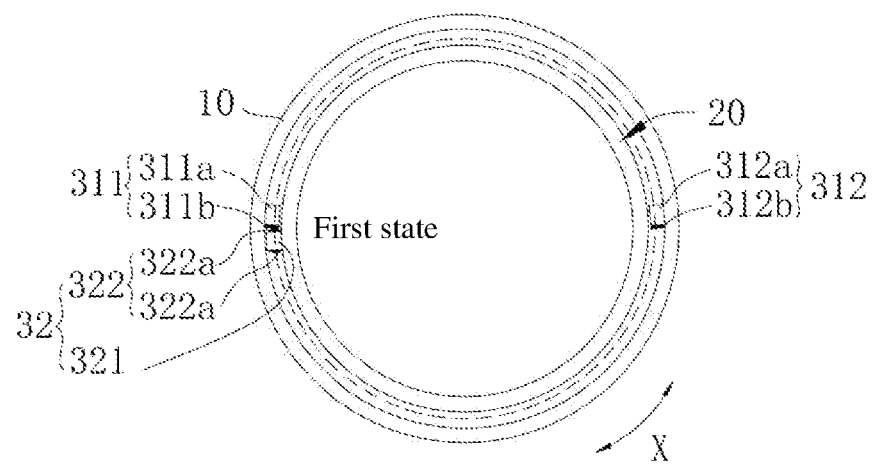
FIG. 7 is a top view of a local structure of a wearable device according to an embodiment of the present disclosure.
Figure 8:
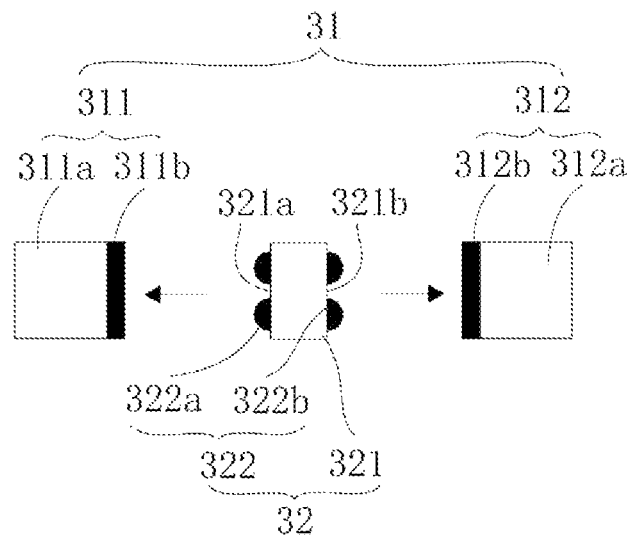
FIG. 8 is a schematic structural diagram of a position detection member according to an embodiment of the present disclosure.

As shown in FIG. 7 and FIG. 8, in some optional embodiments, one of the first component 31 and the second component 32 may include a conductive component, and the other of the first component 31 and the second component 32 may include a contact 322. When the first component 31 includes a conductive component and the second component 32 includes a contact 322, the first subcomponent 311 includes a first conductive subcomponent 311*b*, the second subcomponent 312 includes a second conductive subcomponent 312*b*, when the position detection member 30 is in the first state, the first conductive subcomponent 311*b* is electrically connected to the contact 322, and when the position detection member 30 is in the second state, the second conductive subcomponent 312*b* is electrically connected to the contact 322.

By defining the first component 31 as a conductive component and defining the second component 32 as the structural form of the contact 322, when the watch body 20 rotates relative to the dial 10, a level signal generated when the first component 31 is in contact with the second component 32 can be detected, to determine whether the position detecting member 30 is in the first state or the second state. For example, when the first conductive subcomponent 311*b* is electrically connected to the contact 322, a detection pin connected to the first conductive subcomponent 311*b* or the contact 322 can detect one of a high-level signal and a low-level signal. When the second conductive subcomponent 312*b* is electrically connected to the contact 322, a detection pin connected to the second conductive subcomponent 312*b* or the contact 322 can detect the other of the high-level signal and low-level signal. Then, the level signal may be used to determine the rotation angle of the watch body 20 relative to the dial 10.

Figure 9:
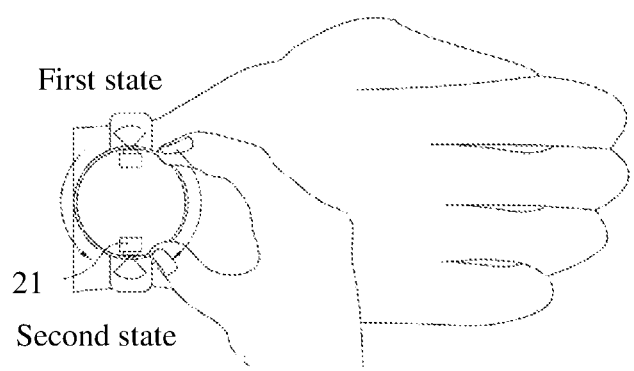
FIG. 9 is a schematic diagram of rotation of a watch body relative to a dial according to an embodiment of the present disclosure.
Figure 10:
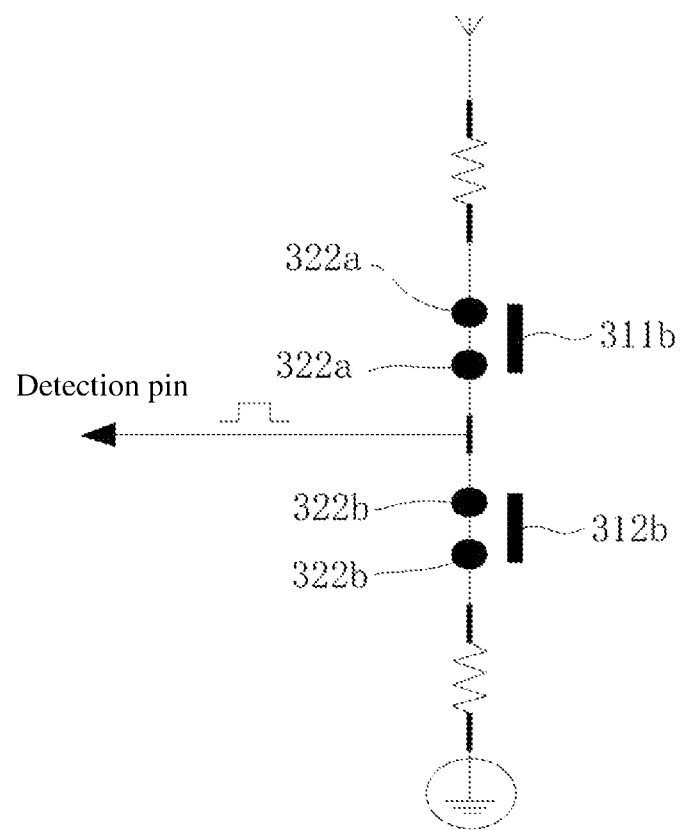
FIG. 10 is a simplified circuit diagram of a position detection member according to an embodiment of the present disclosure.

Refer to FIG. 9 and FIG. 10. To better facilitate understanding, it is defined that the first subcomponent 311 and the second subcomponent 312 are arranged at an interval of 180° along the rotation direction X of the watch body 20. When the first subcomponent 311 and the second component 32 are arranged opposite to each other, the position detection member 30 is in the first state. At this time, the watch body 20 rotates by 0° relative to the dial 10, that is, the watch body 20 is in the initial position, and the high-level signal can be detected by the detection pin. In this case, the camera component 21 can be configured to shoot an external scenery. When the second subcomponent 312 and the second component 32 are arranged opposite to each other, the position detection member 30 is in the second state. At this time, the watch body 20 rotates by 180° relative to the dial 10, and the low-level signal can be detected by the detection pin. In this case, the camera component 21 can be configured to shoot a selfie. In the foregoing manner, the level signal can be used to determine the rotation angle of the watch body 20 relative to the dial 10.

Still refer to FIG. 3 to FIG. 10. As an optional implementation, the second component 32 further includes a mounting body 321, and the contact 322 includes a first sub-contact 322*a* located on a first surface 321*a* of the mounting body 321 and a second sub-contact 322*b* located on a second surface 321*b* of the mounting body 321. The first surface 321*a* and the second surface 321*b* are arranged opposite to each other. The mounting body 321 is connected to and protrudes from one of the watch body 20 and the dial 10. When the position detection member 30 is in the first state, the first conductive subcomponent 311*b* is electrically connected to the first sub-contact 322*a*, and when the position detection member 30 is in the second state, the second conductive subcomponent 312*b* is electrically connected to the second sub-contact 322*b*. By providing the mounting body 321, the mounting of the contact 322 can be facilitated. Besides, the contact 322 can be electrically connected to the first conductive subcomponent 311*b* and the second conductive subcomponent 312*b* when the watch body 20 rotates relative to the dial 10.

Optionally, the first subcomponent 311 further includes a first trigger block 311*a*, the first conductive subcomponent 311*b* is disposed on the first trigger block 311*a*, the second subcomponent 312 further includes a second trigger block 312*a*, and the second conductive subcomponent 312*b* is arranged on the second trigger block 312*a*. When the first component 31 is arranged on the dial 10, the first trigger block 311*a* and the second trigger block 312*a* are connected to and protrude from the dial 10, and when the first component 31 is arranged on the watch body 20, the first trigger block 311*a* and the second trigger block 312*a* are connected to and protrude from the watch body 20. By defining that the first subcomponent 311 includes the first trigger block 311*a* and the second subcomponent 312 includes the second trigger block 312*a*, mounting of the first conductive subcomponent 311*b* and the second conductive subcomponent 312*b* can be facilitated, to ensure that the first conductive subcomponent 311*b* and the second conductive subcomponent 312*b* are reliably in contact with the contact 322.

In some optional examples, the first component 31 may be connected to the dial 10, and may be connected to a first side surface 111 of the dial 10 that encloses to form the receiving groove 11, and the second component 32 may be connected to the watch body 20, and may be connected to a surface of the watch body 20 that faces the first side surface 111. The above arrangement can help the first conductive subcomponent 311*b* and the second conductive subcomponent 312*b* to be in contact with the contact 322 when the watch body 20 rotates relative to the dial 10.

Optionally, the mounting body 321 may be a regular block structure or a square structure. The first surface 321*a* and the second surface 321*b* are arranged opposite to each other in the rotation direction X of the watch body 20, and there may be two first sub-contacts 322*a*, which may be arranged at intervals. The first conductive subcomponent 311*b* may be a regular block structure and be attached to the surface of the first trigger block 311*a* that faces the second component 32. Optionally, the size of the first conductive subcomponent 311*b* in the spaced arrangement direction of the two first sub-contacts 322*a* is greater than the maximum distance between the two first sub-contacts 322*a*. Optionally, the second conductive subcomponent 312*b* may be a regular block structure and be attached to the surface of the second trigger block 312*a* that faces the second component 32. Optionally, the size of the second conductive subcomponent 312*b* in the spaced arrangement direction of the two second sub-contacts 322*b* is greater than the maximum distance between the two second sub-contacts 322*b*. Through the above arrangement, on the basis of ensuring the position detection of the watch body 20 relative to the dial 10, the overall structures of the first component 31 and the second component 32 can be simplified, and it is convenient to detect the rotation angle of the watch body 20 relative to the dial 10.

Figure 11:
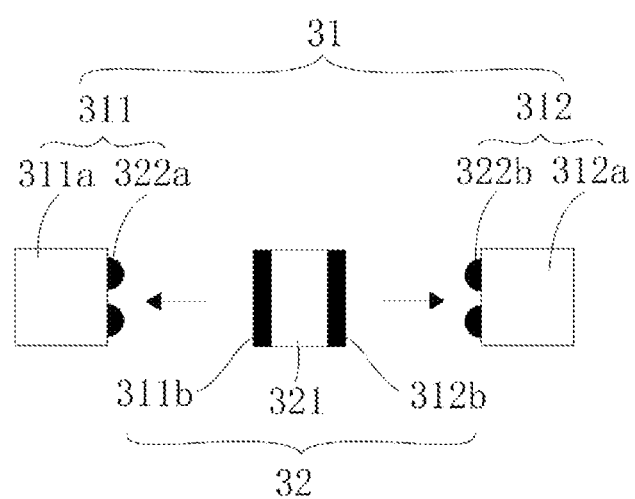
FIG. 11 is a schematic structural diagram of a position detection member according to another embodiment of the present disclosure.

It may be understood that in the wearable device provided in the foregoing embodiments, an example in which the first component 31 is a conductive component and the second component 32 is the contact 322 is used. This is an optional implementation. In some other examples, as shown in FIG. 11, it can also be defined that when the first component 31 includes a contact and the second component 32 includes a conductive component, the first subcomponent 311 includes a first sub-contact 322*a*, the second subcomponent 312 includes a second sub-contact 322*b*, when the position detection member 30 is in the first state, the first sub-contact 322*a* is electrically connected to the conductive component, and when the position detection member 30 is in the second state, the second sub-contact 322b is electrically connected to the conductive component. Through the above arrangement, it may be determined whether the position detection member 30 is in the first state or the second state by detecting the level signal, to determine the rotation angle of the watch body 20 relative to the dial 10.

As an optional implementation, the second component 32 may also include a mounting body 321, and the conductive component includes a first conductive subcomponent 311b located on a first surface 321a of the mounting body 321 and a second conductive subcomponent 312b located on a second surface 321b of the mounting body 321. The first surface 321a and the second surface 321b are arranged opposite to each other. The mounting body 321 is connected to and protrudes from the watch body 20. When the position detection member 30 is in the first state, the first conductive subcomponent 311b is electrically connected to the first sub-contact 322a, and when the position detection member 30 is in the second state, the second conductive subcomponent 312b is electrically connected to the second sub-contact 322b. This arrangement can facilitate the reliability of the electrical connection between the conductive element and the first sub-contact 322a and the electrical connection between the conductive element and the second sub-contact 322b.

Optionally, in this example, the mounting body 321 may also be a regular block structure or a square structure. The first surface 321a and the second surface 321b are arranged opposite to each other in the rotation direction X of the watch body 20. The first conductive subcomponent 311b may be a regular block structure and be attached to the first surface 321a of the mounting body 321.

Optionally, there may be two first sub-contacts 322a, which are arranged at intervals. The two first sub-contacts 322a can be connected to the dial 10 through the first trigger block 311a. The first trigger block 311a is a part of the first subcomponent 311. Optionally, the size of the first conductive subcomponent 311b in the spaced arrangement direction of the two first sub-contacts 322a is greater than the maximum distance between the two first sub-contacts 322a.

Optionally, the second conductive subcomponent 312b may be a regular block structure and be attached to the second surface 321b of the mounting body 321. Optionally, there may be two second sub-contacts 322b, which are arranged at intervals. The two second sub-contacts 322b can be connected to the dial 10 through the second trigger block 312a, and the second trigger block 312a is a part of the second subcomponent 312. The size of the second conductive subcomponent 312b in the spaced arrangement direction of the two second sub-contacts 322b is greater than the maximum distance between the two second sub-contacts 322b. Through the above arrangement, on the basis of ensuring the position detection of the watch body 20 relative to the dial 10, the overall structures of the first component 31 and the second component 32 can be simplified, and it is convenient to detect the rotation angle of the watch body 20 relative to the dial 10.

It may be understood that in the wearable device provided in the foregoing embodiments, an example in which the first component 31 is connected to the dial 10 and the second component 32 is connected to the watch body 20 is used. In some other examples, the first component 31 can also be connected to the watch body 20 and the second component 32 can be connected to the dial 10, which can also meet the requirement of position detection of the watch body 20 and the dial 10.

It can be understood that, in the above embodiments, it is determined whether the position detection member 30 is in the first state or the second state by detecting the high-level signal and the low-level signal, to determine the rotation angle of the watch body 20 relative to the dial 10. This is an optional manner, but a manner is not limited thereto. In some other embodiments, it may also be determined whether the position detection member is in the first state or the second state by detecting a current signal or the like.

For example, a resistance value of the first conductive subcomponent 311b and a resistance value of the second conductive subcomponent 312b in the foregoing embodiments may be set to be different. When the first conductive subcomponent 311b is electrically connected to the contact 322, a current that can be detected by a detection pin connected to the first conductive subcomponent 311b or the contact 322 is a first current value. When the second conductive subcomponent 312b is electrically connected to the contact 322, a current value that can be detected by a detection pin connected to the second conductive subcomponent 312b or the contact 322 is a second current value. Because resistances of the first conductive subcomponent 311b and the second conductive subcomponent 312b are different, the detected first current value and second current value are also different. In this way, it can also be determined whether the position detection member 30 is in the first state or the second state, to feed back the position of the watch body 20 relative to the dial 10.

Figure 12:
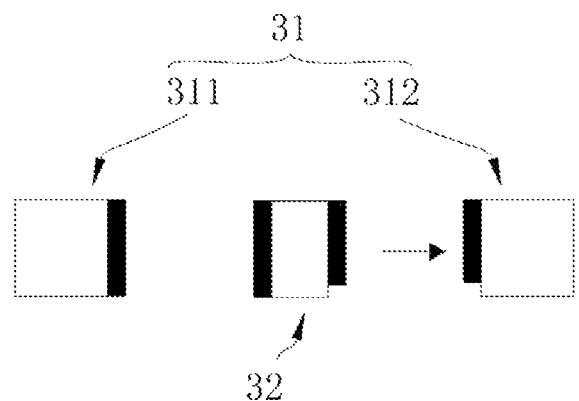
FIG. 12 is a schematic structural diagram of a position detection member according to still another embodiment of the present disclosure.
Figure 13:
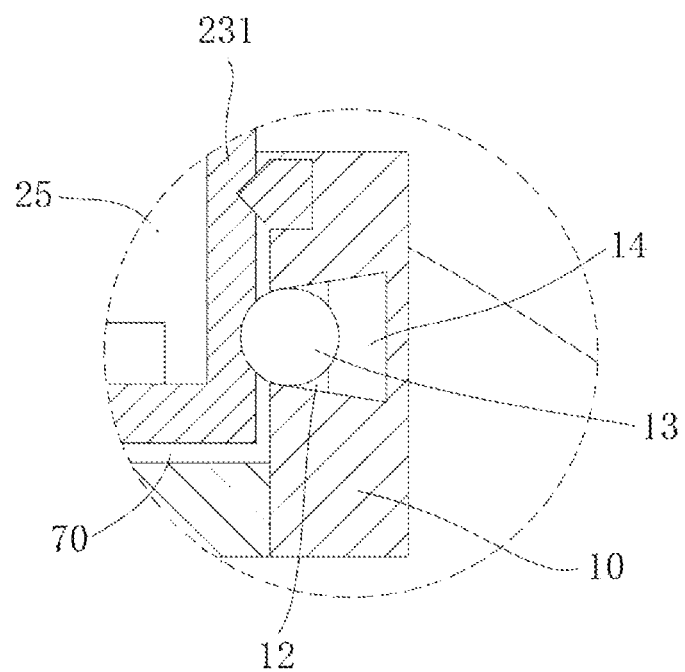
FIG. 13 is an enlarged diagram of a position B in FIG. 4.

Certainly, in the foregoing embodiments, defining one of the first component 31 and the second component 32 as a conductive member and the other of the first component 31 and the second component 32 as a contact, and detecting the rotation angle of the watch body 20 relative to the dial 10 based on a high-level signal and a low-level signal or a current signal are only two preferred implementations. In some other examples, as shown in FIG. 12, it can also be defined that the first subcomponent 311, the second subcomponent 312, and the second component 32 are all metal plate structures. When the position detection member 30 is in the first state, the first subcomponent 311 is opposite to the second component 32 to form a first parallel plate capacitor, when the position detection member 30 is in the second state, the second subcomponent 312 is opposite to the second component 32 to form a second parallel plate capacitor, and the capacitance of the first parallel plate capacitor is different from the capacitance of the second parallel plate capacitor. Therefore, it may be determined whether the position detection member 30 is in the first state or the second state according to the detected capacitance value, to satisfy the detection requirement of the rotation angle of the watch body 20 relative to the dial 10.

In the wearable device provided by the foregoing embodiments of the present disclosure, both the number of first components 31 and the number of second components 32 included in the wearable device can be one, which can satisfy the detection of at least two relative positions of the watch body 20 relative to the dial 10. Certainly, in some other examples, the number of first components 31 can also be at least three, and/or the number of second components 32 can also be at least two. Through the above arrangement, additional first components 31 and/or second components 32 may be arranged, to avoid failure of the position detection member 30 due to the damage of the first component 31 and/or the second component 32. Besides, in the above arrangement, the position detection member 30 can detect more than two relative positions of the watch body 20 relative to the dial 10, to better optimize the performance of the wearable device.

As an optional implementation, in the wearable device provided in the foregoing embodiments, the first component 31 of the position detection member 30 is arranged at intervals along a first pitch circle, the second component 32 is arranged along a second pitch circle, and the center of the first pitch circle is the center of the second pitch circle. Through the above arrangement, when the watch body 20 rotates relative to the dial 10 and drives the first component 31 and the second component 32 to move relative to each other, the first component 31 and the second component 32 have a good alignment effect, which can further improve detection precision of the position detection member 30.

Refer to FIG. 3 to FIG. 13. In some optional embodiments, one of the dial 10 and the watch body 20 further includes a limiting ball 13 and an elastic member 14 that abut against each other, the other one of the dial 10 and the watch body 20 is provided with a limiting slot 22, and when the limiting ball 13 is at least partially located in the limiting slot 22, the dial 10 and the watch body 20 are clamped by the limiting ball 13 and the limiting slot 22. The limiting ball 13 and the elastic member 14 are provided on one of the dial 10 and the watch body 20, and the limiting slot 22 is provided on the other of the dial 10 and the watch body 20, so that the dial 10 and the watch body 20 are clamped through the limiting ball 13 and the limiting slot 22, to prevent the functional component from rotating relative to the dial 10 when rotating to a predetermined position, and solve the problem that relative positions of the functional component and the dial 10 are difficult to lock.

Optionally, the dial 10 may include a limiting ball 13 and an elastic member 14. The dial 10 is further provided with a mounting slot 12. The elastic member 14 is slidably connected to the mounting slot 12, and the elastic member 14 is at least partially located in the mounting slot 12. A side of the watch body 20 that faces the dial 10 is provided with a limiting slot 22. When the mounting slot 12 and the limiting slot 22 are not opposite to each other, the elastic member 14 is elastically deformed. When the mounting slot 12 is opposite to the limiting slot 22, the elastic member 14 elastically recovers, and the limiting ball 13 is at least partially located in the limiting slot 22.

Through the above arrangement, the position of the functional component can be locked when the functional component rotates to a predetermined position relative to the dial 10 along with the watch body 20, and it is convenient to mount the elastic member 14 and the limiting ball 13. More importantly, the above structural form allows the user to apply a predetermined external force to detach the limiting ball 13 from the limiting slot 22 when the functional component needs to rotate to a next position, to satisfy the position adjustment requirement of the functional component.

In an implementation, the mounting slot 12 on the dial 10 may be formed by recessing the first side surface 111 in a direction away from the receiving groove 11, and the mounting slot 12 and the receiving groove 11 are communicated with each other. The above forming method facilitates processing and manufacturing, and can better ensure the requirement of position locking between the watch body 20 and the dial 10. Optionally, the elastic member 14 may be a spring or an elastic pad with a predetermined deformability, such as a rubber pad.

As an optional implementation, the size of the opening of the mounting slot 12 is smaller than the diameter of the limiting ball 13, and the limiting ball 13 is located between the watch body 20 and the elastic member 14. Through the above arrangement, when the watch body 20 is removed from the mounting slot 12, the limiting ball 13 can always be located in the mounting slot 12 without coming out, to prevent that the elastic member 14 and the limiting ball 13 are lost when the wearable device is assembled or repaired, or the dial 10 or the watch body 20 of a different color is replaced. Besides, it is more conducive to the assembly of the wearable device.

As an optional implementation, the number of limiting slots 22 may be more than two, and the more than two limiting slots 22 may be distributed at intervals along the rotation direction X of the watch body 20, and may be evenly distributed at intervals. Through the above arrangement, when the functional component has more than two predetermined positions relative to the dial 10, the position of the functional component can be limited or locked when the functional component rotates to different predetermined positions relative to the dial 10 along with the watch body 20.

Still refer to FIG. 3 to FIG. 13. In some optional embodiments, the wearable device of the above embodiments may further include a rotating connecting piece 40. The dial 10 and the watch body 20 are rotatably connected to each other through the rotating connecting piece 40. The rotating connecting piece 40 includes a rotating guide rail 41 and a guide component 42 that cooperate with each other. One of the rotating guide rail 41 and the guide component 42 is arranged on the dial 10 and the other of the rotating guide rail 41 and the guide component 42 is arranged on the watch body 20. The rotating guide rail 41 extends along the rotation direction X of the watch body 20. By setting the rotating connecting piece 40, the watch body 20 can rotate according to a predetermined trajectory when the watch body 20 rotates relative to the dial 10, to ensure rotation stability performance. At the same time, the watch body 20 can also be limited to prevent the watch body 20 from detaching from the receiving groove 11 of the dial 10 when the watch body 20 rotates relative to the dial 10.

In some optional examples, the thickness of the guide component 42 gradually decreases from an end away from the rotating guide rail 41 to an end close to the rotating guide rail 41, and the shape of the rotating guide rail 41 matches the shape of the guide component 42. Through the above arrangement, on the basis of ensuring the functional requirement of the rotating connecting piece 40, it is convenient to extend a part of the guide component 42 into the rotating guide rail 41 when the wearable device is assembled. Besides, it is convenient to remove the watch body 20 from the dial 10 when the watch body 20 or the dial 10 is replaced.

In some optional examples, the watch body 20 includes a second side surface 233 facing the first side surface 111 of the dial 10, and a second bottom surface 234 facing the first bottom surface 112 of the dial 10. The second side surface 233 and the second bottom surface 234 may be located at the main body portion 231 of the first housing 23. In an example, the second side surface 233 may be provided with the guide component 42, and the first side surface 111 is provided with the rotating guide rail 41 slidably connected to the guide component 42. Certainly, in some other examples, the second bottom surface 234 is provided with the guide component 42, and the first bottom surface 112 is provided with the rotating guide rail 41 slidably connected to the guide component 42 on the second bottom surface 234.

In some optional embodiments, the second component 32 may be disposed on the second side surface 233.

As an optional implementation, a gap 70 is formed between the first bottom surface 112 and the second bottom surface 234. Through the above arrangement, a friction force between the watch body 20 and the dial 10 can be reduced when the watch body 20 rotates relative to the dial 10, so that the relative rotation between the watch body 20 and the dial 10 is smoother.

It can be understood that, in some examples, it may also be defined that the second side surface 233 may be provided with the rotating guide rail 41, and the first side surface 111 is provided with the guide component 42 that is slidably connected to the rotating guide rail 41. Similarly, it may also be defined that the second bottom surface 234 is provided with the rotating guide rail 41, and the first bottom surface 112 is provided with the guide component 42 that is slidably connected to the rotating guide rail 41 on the second bottom surface 234. Each above setting can perform guiding and limiting functions when the watch body 20 and the dial 10 rotate relative to each other.

To facilitate wearing of the wearable device, optionally, the wearable device of each of the foregoing embodiments may further include a watch strap 50, and the watch strap 50 is connected to the dial 10 and enclose along with the dial 10 to form a fixation ring that can be opened or buckled.

Figure 14:
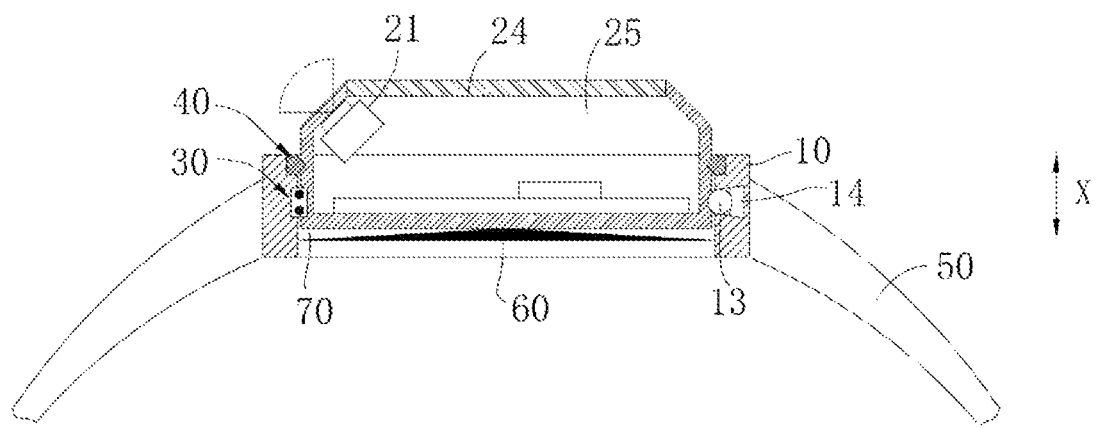
FIG. 14 is a cross-sectional view of a wearable device according to another embodiment of the present disclosure.

As shown in FIG. 14, as an optional implementation, the wearable device of the foregoing embodiments of the present disclosure may further include a support component 60. The support component 60 is disposed between the dial 10 and the watch body 20, and the contact area of the support component 60 and the first bottom surface 112 is larger than the contact area of the support component 60 and the second bottom surface 234. By providing the support component 60 and defining the above manner of cooperating with the first bottom surface 112 and the second bottom surface 234, the support requirement of the watch body 20 can be met, and friction can be reduced when the watch body 20 rotates relative to the dial 10, to ensure smooth rotation of the watch body 20.

Optionally, the support component 60 can be arranged in the gap 70 and can use a variety of structural forms. The support component 60 can be a conical cone-shaped structure, and the cross-sectional area of the support component 60 gradually decreases in a direction from the first bottom surface 112 to the second bottom surface 234. The above structural form is simple, and it is more conducive to rotation of the watch body 20 relative to the dial 10.

Figure 15:
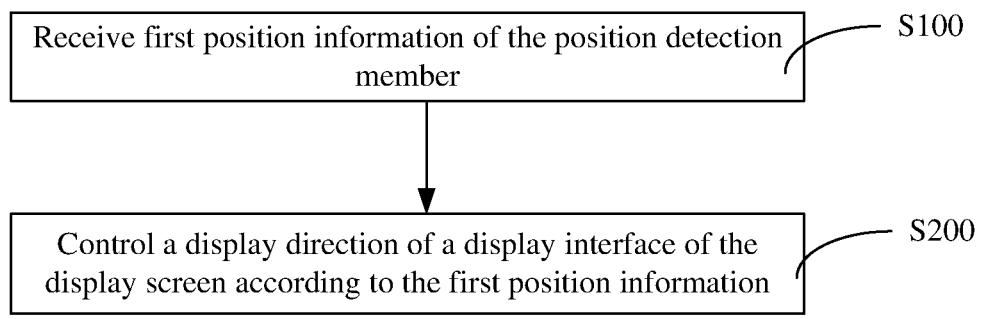
FIG. 15 is a schematic flowchart of a display method according to an embodiment of the present disclosure.

As shown in FIG. 15, the embodiments of the invention further provide a display method, applied to a wearable device, where the wearable device includes a dial, a watch body, and a position detection member, the dial is provided with a receiving groove, the watch body is at least partially disposed in the receiving groove and rotatably connected to the dial, the watch body is provided with a display screen and a camera component, and the method includes:
  S100. Receive first position information of the position detection member.
  S200. Control a display direction of a display interface of the display screen according to the first position information.

In the embodiments of the present disclosure, first position information of the position detection member is received; and a display direction of a display interface of the display screen is controlled according to the first position information. This can help ensure that the display direction of the display interface is always a direction that facilitates observation of the user, so that the user has better user experience.

Optionally, the wearable device to which the display method provided in the embodiments of the present disclosure is applied may be the wearable device of the foregoing embodiments. The mechanical structure thereof such as the structural forms and cooperation relationships of the dial, the watch body, and the position detection member may be the structural forms of the dial 10, the watch body 20, and the position detection member 30 of the wearable device of the foregoing embodiments. To better facilitate understanding, the present disclosure uses an example in which the display method is applied to the wearable device of the foregoing embodiments, that is, the wearable devices shown in FIG. 3 to FIG. 14. The same structure will not be repeated herein.

In step S100, the first position information can be determined according to the structure of the position detection member 30. For example, when the first component 31 and the second component 32 of the position detection member 30 adopt the structural form of the conductive component and the contact in the foregoing embodiments, the first position information can be a high-level signal or a low-level signal, and certainly can also be a current signal. If the first subcomponent 311, the second subcomponent 312, and the second component 32 of the position detection member 30 are all metal plate structures, the first position information may be a capacitance signal or the like.

Figure 16:
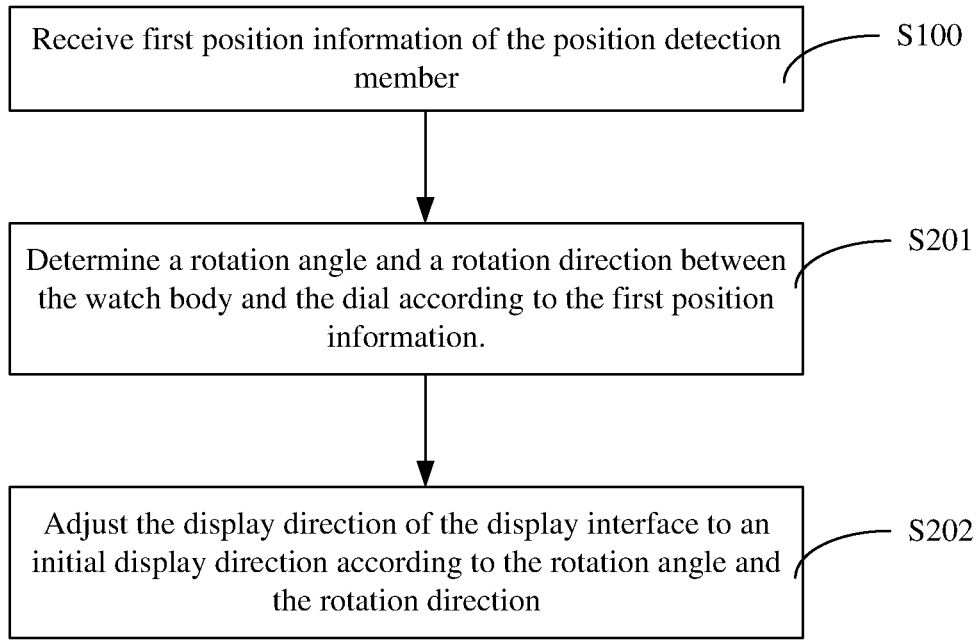
FIG. 16 is a schematic flowchart of a display method according to another embodiment of the present disclosure.

As shown in FIG. 16, in some optional examples, step S200 may include:
  S201: Determine a rotation angle and a rotation direction between the watch body 20 and the dial 10 according to the first position information.
  S202: Adjust the display direction of the display interface to an initial display direction according to the rotation angle and the rotation direction; where the initial display direction is a display direction of the display interface of the display screen 24 when the rotation angle between the watch body 20 and the dial 10 is 0°.

In step 201, if the first position information is a level signal, the rotation angle between the watch body 20 and the dial 10 can be determined according to whether the detected level signal is a high-level signal or a low-level signal.

For example, when the detected first position information is a level signal and is specifically a low level signal, the position detection member 30 is in the second state and the watch body 20 rotates by 180° relative to the dial 10, and when the detected first position information is a high-level signal, the position detection member 30 is in the first state and the watch body 20 rotates by 0° relative to the dial 10. Similarly, if the first position information is a current signal or a capacitance signal, the rotation angle of the watch body 20 relative to the dial 10 can also be determined based on a detected current signal value or capacitance signal value.

In step S202, the rotation angle between the watch body 20 and the dial 10 can be determined based on the first position information, and the display interface of the display screen 24 can be controlled to rotate, so that the display direction of the display interface can be adjusted to the initial display direction, which is convenient for the user to view the time or the picture taken by the camera component 21.

Figure 17:
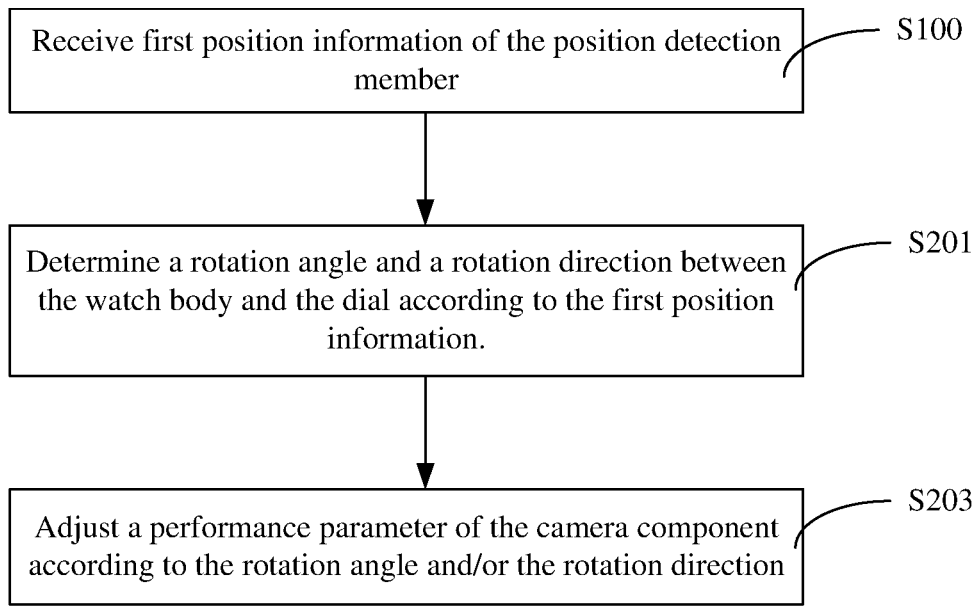
FIG. 17 is a schematic flowchart of a display method according to still another embodiment of the present disclosure.

As shown in FIG. 17, as an optional implementation, step S200 further includes:
  S203: Adjust a performance parameter of the camera component 21 according to the rotation angle and/or the rotation direction X, where the performance parameter includes at least one of resolution, focal length, definition, or contrast.

The main purpose of rotating the watch body 20 relative to the dial 10 is to adjust the camera component 21 to different positions under different shooting requirements. For example, when the watch body 20 and the dial 10 are in the initial state, that is, when the watch body 20 and the dial 10 do not rotate relative to each other, the location of the camera component 21 can be in an external scenery shooting mode, and when the watch body 20 and the dial 10 rotate by a predetermined angle relative to each other, such as 180°, the location of the camera component 21 is in a selfie shooting mode. Therefore, the position of the camera component 21 can be known according to the rotation angle and/or the rotation direction of the watch body 20 and the dial 10. Then, the performance parameter of the camera component 21 is adjusted to match with the position of the camera component 21, which can optimize the shooting effect.

In some optional embodiments, step S203 may include: determining a shooting mode of the camera component 21 according to the rotation angle and/or the rotation direction; obtaining a parameter value of the performance parameter in the shooting mode; and adjusting the camera component 21 according to the parameter value.

In the step of determining the shooting mode of the camera component 21 according to the rotation angle and/or the rotation direction, the shooting mode of the camera component 21 can be obtained according to the rotation angle and/or the rotation direction. For example, when it is known that the watch body 20 does not rotate relative to the dial 10, that is, when the rotation angle is 0°, it is determined that the shooting mode of the camera component 21 is the external scenery shooting mode. In this shooting mode, it is suitable for shooting a scenery, other people, or a large scene. A pixel parameter value of performance parameters in this mode is high. Similarly, when it is known that the watch body 20 rotates by a predetermined angle relative to the dial 10, such as 180°, it can be determined that the shooting mode is the selfie shooting mode. In this case, the requirement for the pixel parameter value is low, and a corresponding parameter of the camera component 21 is adjusted according to the corresponding parameter value. This is easy to control and can better guarantee the shooting effects in different modes.

Certainly, the above two modes corresponding to the rotation angles 0° and 180° of the watch body 20 and the dial 10 are only examples and constitute no limitation. For example, it may be defined that rotation of the watch body 20 by 90° relative to the dial 10 corresponds to the external scenery shooting mode or the selfie shooting mode, as long as the shooting display effect can be improved.

Figure 18:
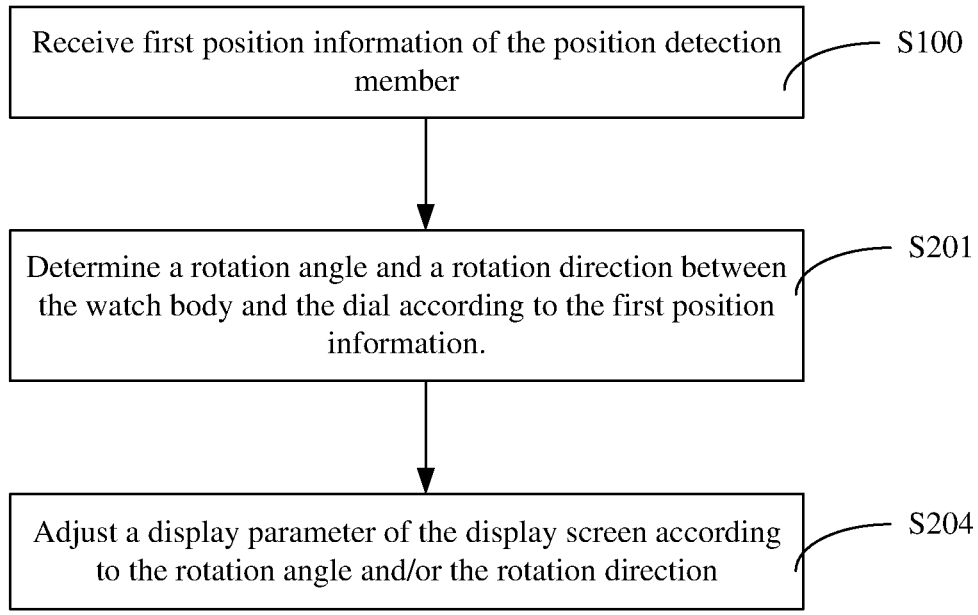
FIG. 18 is a schematic flowchart of a display method according to yet another embodiment of the present disclosure.

As shown in FIG. 18, as an optional implementation, step S200 further includes:
S204. Adjust a display parameter of the display screen 24 according to the rotation angle and/or the rotation direction, where the display parameter includes at least one of brightness, contrast, resolution, hue, or a size of the display interface. Through the above arrangement, when the watch body 20 rotates to a predetermined position relative to the dial 10, a display effect is better and the user has better viewing experience.

Figure 19:
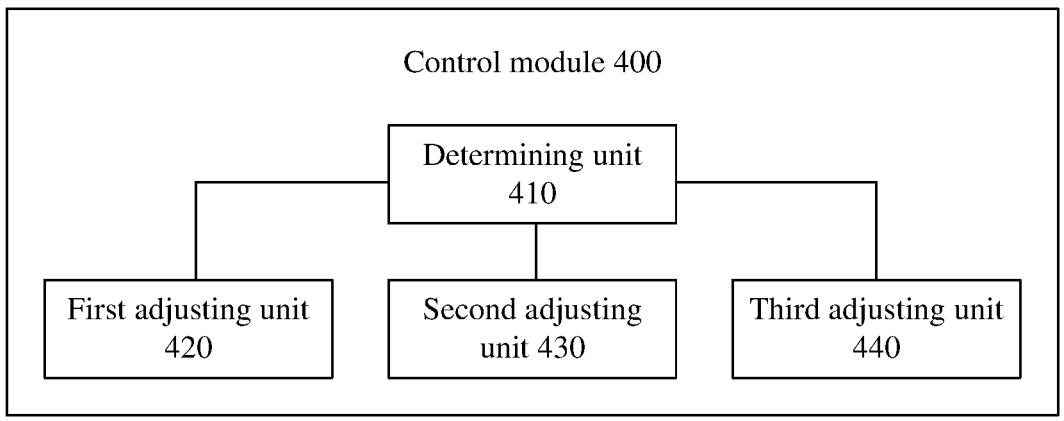
FIG. 19 is a schematic diagram of a control module in a wearable device according to an embodiment of the present disclosure.
Figure 20:
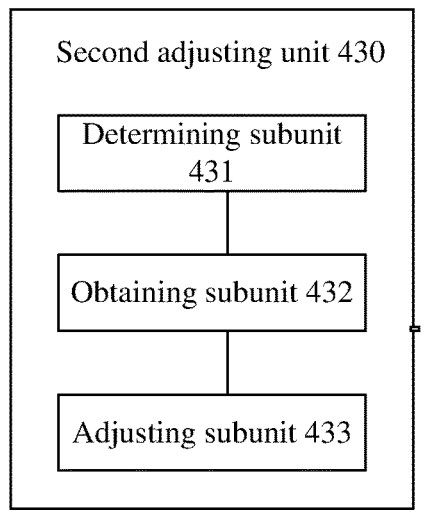
FIG. 20 is a schematic diagram of a second adjusting unit according to an embodiment of the present disclosure.

Refer to FIG. 19 and FIG. 20. Further, the embodiments of the present disclosure further provide a wearable device. The wearable device includes a dial, a watch body, and a position detection member, the dial is provided with a receiving groove, the watch body is at least partially disposed in the receiving groove and rotatably connected to the dial, the watch body is provided with a display screen and a camera component, and the position detection member is disposed in at least one of the dial or the watch body. Besides, the wearable device further includes: a receiving module and a control module 400. The receiving module is configured to receive first position information of the position detection member 30; and the control module 400 is configured to control a display direction of a display interface of the display screen 24 according to the first position information.

In the wearable device provided in the embodiments of the present disclosure, the wearable device is limited to include the receiving module and the control module 400, the receiving module is configured to receive first position information of the position detection member 30; and the control module 400 is configured to control a display direction of a display interface of the display screen 24 according to the first position information. This can help ensure that the display direction of the display interface is always a direction that facilitates observation of the user, so that the user has better user experience.

In the wearable device provided by the embodiments of the present disclosure, the mechanical structure thereof such as the structural forms and cooperation relationships of the dial, the watch body, and the position detection member may be the structural forms of the dial, the watch body, and the position detection member of the wearable device of the foregoing embodiments. Besides, the wearable device may also include the rotating connecting piece 40, the limiting ball 13, the elastic member 14, the limiting slot 22, the support component 60, and the watch strap 50 of the wearable device of the foregoing embodiments, to form the structural form shown in any one of FIG. 3 to FIG. 14, and the same mechanical structure will not be repeated herein.

In an implementation, the first position information can be determined according to the structure of the position detection member 30. For example, when the first component 31 and the second component 32 of the position detection member 30 adopt the structural form of the conductive component and the contact in the foregoing embodiments, the first position information can be a high-level signal or a low-level signal, and certainly can also be a current signal. If the first subcomponent 311, the second subcomponent 312, and the second component 32 of the position detection member 30 are all metal plate structures, the first position information may be a capacitance signal or the like.

As an optional implementation, the control module 400 may include a determining unit 410 and a first adjusting unit 420. The determining unit 410 is configured to determine the rotation angle and the rotation direction between the watch body 20 and the dial 10 according to the first position information. The first adjusting unit 420 is configured to adjust the display direction of the display interface to an initial display direction according to the rotation angle and the rotation direction; where the initial display direction is a display direction of the display interface of the display screen 24 when the rotation angle between the watch body 20 and the dial 10 is 0°.

Through the above arrangement, when the watch body 20 rotates relative to the dial 10, the display direction of the display interface of the display screen 24 can be accurately adjusted to the initial display direction, which is more convenient for the user to watch.

As an optional implementation, the control module 400 further includes a second adjusting unit 430, configured to adjust a performance parameter of the camera component 21 according to the rotation angle and/or the rotation direction of the watch body 20 and the dial 10, where the performance parameter includes at least one of resolution, focal length, definition, or contrast.

Through the above setting, the performance parameter and the position of the camera component 21 can match with each other, thereby optimizing the shooting effect.

In some optional embodiments, the second adjusting unit 430 includes a determining subunit 431, an obtaining subunit 432, and an adjusting subunit 433. The determining subunit 431 is configured to determine a shooting mode of the camera component 21 according to the rotation angle and/or the rotation direction X. The obtaining subunit 432 is configured to obtain a parameter value of the performance parameter in the shooting mode. The adjusting subunit 433 is configured to adjust the camera component 21 according to the parameter value. The second adjusting unit 430 adopts the above form, so that the corresponding parameter of the camera component 21 can be adjusted according to corresponding parameter values in different shooting modes. This is easy to control and can better guarantee shooting effects in different shooting modes.

As an optional implementation, the control module 400 further includes a third adjusting unit 440, configured to adjust a display parameter of the display screen 24 according to the rotation angle and/or the rotation direction, where the display parameter includes at least one of brightness, contrast, resolution, hue, or a size of the display interface. Through the arrangement of the third adjusting unit, when the watch body 20 rotates to a predetermined position relative to the dial 10, a display effect is better and the user has better viewing experience.

Figure 21:
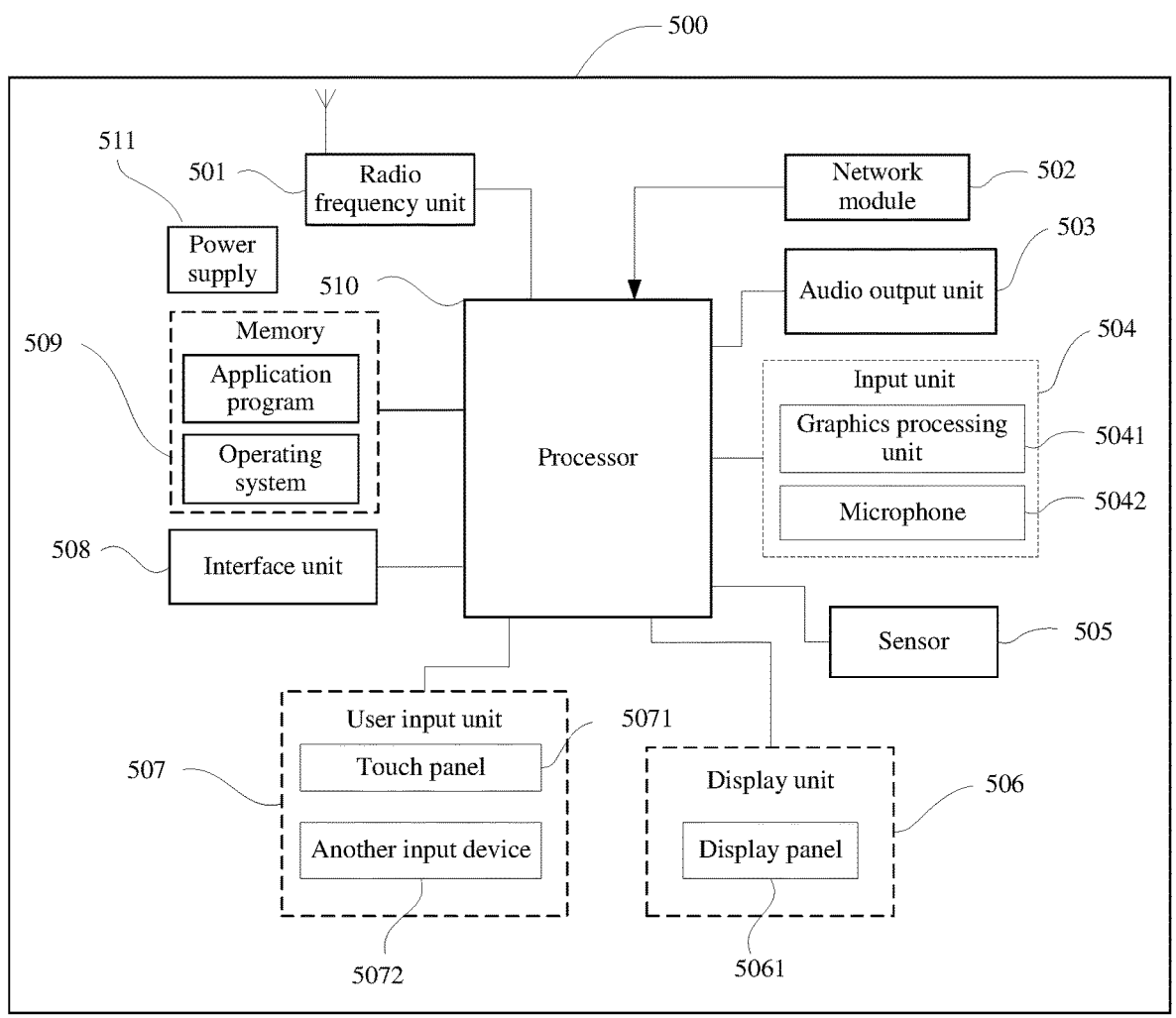
FIG. 21 is a schematic structural diagram of hardware of a wearable device according to embodiments of the present disclosure.

As shown in FIG. 21, preferably, the embodiments of the present disclosure further provide a wearable device 500, and its structural form may be the structural form shown in FIG. 3 to FIG. 14 in the above embodiments. At the same time, the wearable device 500 further includes but is not limited to components such as a radio frequency unit 501, a network module 502, an audio output unit 503, an input unit 504, a sensor 505, a display unit 506, a user input unit 507, an interface unit 508, a memory 509, a processor 510, and a power supply 511. A person skilled in the art may understand that the structure of the wearable device shown in FIG. 21 does not constitute a limitation to the wearable device. The wearable device may include more or fewer components than that shown in the figure, or a combination of some components, or an arrangement of different components. In the embodiments of the present disclosure, the wearable devices include, but are not limited to, smart watches, bracelets, wristbands, pedometers, and the like.

The radio frequency unit 501 is configured to receive first position information of the position detection member.

The processor 510 is configured to control a display direction of a display interface of the display screen according to the first position information.

The wearable device 500 provided by the embodiments of the present disclosure controls the display direction of the display interface of the display screen. This can help ensure that the display direction of the display interface is always a direction that facilitates observation of the user, so that the user has better user experience.

It should be understood that in this embodiment of the present disclosure, the radio frequency unit 501 may be configured to receive and transmit information, or receive and transmit signals during a call. For example, the radio frequency unit receives downlink data from a base station, and transmits the downlink data to the processor 510 for processing; and in addition, transmits uplink data to the base station. Generally, the radio frequency unit 501 includes, but is not limited to, an antenna, at least one amplifier, a transceiver, a coupler, a low noise amplifier, a duplexer, and the like. In addition, the radio frequency unit 501 may further communicate with another device by using a wireless communication system and network.

The wearable device 500 provides a user with wireless broadband Internet access through the network module 502, for example, helping the user to send and receive an e-mail, browse a web page, and access streaming media.

The audio output unit 503 may convert audio data received by the radio frequency unit 501 or the network module 502 or stored in the memory 509 into an audio signal and output as sound. In addition, the audio output unit 503 may further provide audio output (for example, call signal receiving sound or message receiving sound) related to a specific function performed by the wearable device 500. The audio output unit 503 includes a loudspeaker, a buzzer, a telephone receiver, and the like.

The input unit 504 is configured to receive an acoustic signal or a video signal. The input unit 504 may include a graphics processing unit (GPU) 5041 and a microphone 5042. The graphics processing unit 5041 processes image data of a static image or video obtained by an image capture apparatus (such as, a camera) in a video capture mode or an image capture mode. A processed image frame can be displayed on the display unit 506. The image frame processed by the graphics processing unit 5041 may be stored in the memory 509 (or another storage medium) or sent by using the radio frequency unit 501 or the network module 502 The microphone 5042 may receive sound and can process such sound into audio data. The processed audio data may be converted in a call mode into a format that can be sent by the radio frequency unit 501 to a mobile communication base station for outputting.

The wearable device 500 further includes at least one sensor 505, such as an optical sensor, a motion sensor, and other sensors. For example, the optical sensor includes an ambient optical sensor and a proximity sensor. The ambient optical sensor may adjust luminance of the display panel 5061 based on brightness of ambient light. The proximity sensor may turn off the display panel 5061 and/or backlight when the wearable device 500 moves to an ear. As a type of the motion sensor, an accelerometer sensor may detect magnitude of an acceleration in each direction (generally three axes), and may detect magnitude and a direction of gravity when being static. The accelerometer sensor may be used for recognizing a gesture of the wearable device 500 (for example, horizontal and vertical screen switching, a related game, or magnetometer posture calibration), a function related to vibration recognition (for example, a pedometer or a strike), or the like. The sensor 505 may further include a fingerprint sensor, a pressure sensor, an iris sensor, a molecular sensor, a gyroscope, a barometer, a hygrometer, a thermometer, an infrared sensor, and the like. This is not described herein.

The display unit 506 is configured to display information entered by the user or information provided for the user. The display unit 506 may include a display panel 5061, and the display panel 5061 may be configured in a form of a liquid crystal display (LCD), an organic light-emitting diode (OLED), or the like.

The user input unit 507 may be configured to receive input numeral or character information, and generate key signal input related to user setting and function control of the wearable device 500. For example, the user input unit 507 includes a touch panel 5071 and another input device 5072. The touch panel 5071, also referred to as a touchscreen, may collect a touch operation performed by the user on or near the touch panel (for example, an operation performed by the user on or near the touch panel 5071 by using any suitable object or accessory such as a finger or a stylus). The touch panel 5071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, and sends the touch point coordinates to the processor 510, and can receive and execute a command sent by the processor 510. In addition, the touch panel 5071 may be implemented by using a plurality of types such as a resistive type, a capacitive type, an infrared ray, and a surface acoustic wave. In addition to the touch panel 5071, the user input unit 507 may further include the another input device 5072. The another input device 5072 may include, but is not limited to, a physical keyboard, function keys (for example, a volume control key and an on/off key), a trackball, a mouse, or a joystick. Details are not described herein.

Optionally, the touch panel 5071 may cover the display panel 5061. When the touch panel 5071 detects a touch operation on or near the touch panel, the touch operation is transmitted to the processor 510 to determine a type of a touch event, and then the processor 510 provides corresponding visual output on the display panel 5061 according to the type of the touch event. Although in FIG. 21, the touch panel 5071 and the display panel 5061 are configured as two independent components to implement input and output functions of the wearable device, in some embodiments, the touch panel 5071 and the display panel 5061 can be integrated to implement the input and output functions of the wearable device. Details are not limited herein.

The interface unit 508 is an interface for connecting an external apparatus with the wearable device 500. For example, the external apparatus may include a wired or wireless headset port, an external power supply (or battery charger) port, a wired or wireless data port, a storage card port, a port configured to connect to an apparatus having an identification module, an audio input/output (I/O) port, a video I/O port, a headset port, and the like. The interface unit 508 may be configured to receive an input (for example, data information or power) from an external apparatus and transmit the received input to one or more elements in the wearable device 100, or transmit data between the wearable device 100 and the external apparatus.

The memory 509 may be configured to store a software program and various data. The memory 509 may mainly include a program storage area and a data storage area. The program storage area may store an operating system, an application for at least one function (for example, a sound play function or an image play function), and the like. The data storage area may store data (for example, audio data or an address book) or the like created based on use of a mobile phone. In addition, the memory 509 may include a high-speed random access memory, or may include a nonvolatile memory, for example, at least one disk storage device, a flash memory, or another volatile solid-state storage device.

The processor 510 is a control center of the wearable device. The processor 510 uses various interfaces and lines to connect all parts of the entire wearable device, and performs various functions and data processing of the wearable device by running or executing the software program and/or module stored in the memory 509 and invoking data stored in the memory 509, thereby performing overall monitoring on the wearable device. The processor 510 may include one or more processing units. Optionally, the processor 510 may integrate an application processor and a modem processor. The application processor mainly deals with an operating system, a user interface, an application, and the like. The modem processor mainly deals with wireless communication. It can be understood that, alternatively, the modem processor may not be integrated into the processor 510.

The wearable device 500 can further include a power supply 511 (for example, a battery) which supplies power to all parts. Preferably, the power supply 511 can be in a logical connection with the processor 510 through a power supply management system, thus conducting functions such as management on charging and discharging and management on power consumption through the power supply management system.

In addition, the wearable device 500 further includes some function modules not shown, and details are not described herein.

An embodiment of the present disclosure further provides a non-transitory computer-readable storage medium. The non-transitory computer-readable storage medium stores a computer program. When the computer program is executed by a processor, the processes of the foregoing embodiments of the display method are implemented, and a same technical effect can be achieved. To avoid repetition, details are not described herein again. The non-transitory computer-readable storage medium includes a read-only memory (ROM), a random access memory (RAM), a magnetic disk, an optical disc, or the like.

A person of ordinary skill in the art may be aware that, in combination with the examples described in the embodiments disclosed in this specification, units and algorithm steps may be implemented by electronic hardware or a combination of computer software and electronic hardware. Whether these functions are performed by using hardware or software depends on a specific application and design constraints of the technical solution. Those skilled in the art may use different methods to implement the described functions for each specific application, but such implementation should not be considered as beyond the scope of the present disclosure.

A person skilled in the art can clearly understand that to describe conveniently and concisely, for a specific working process of the system, apparatus, and unit described above, refer to the corresponding process in the foregoing method embodiments. Details are not described herein again.

In the embodiments provided in the present application, it should be understood that the disclosed apparatus and method may be implemented in other manners. For example, the apparatus embodiment described above is only an example. For example, division into the units is only logical function division. There may be other division manners in actual implementation, for example, a plurality of units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

The units described as separate components may or may not be physically separated, and the components displayed as units may or may not be physical units, and may be located in one place or may be distributed on a plurality of network units. Some or all of the units may be selected according to actual needs to achieve the objective of the solutions of the embodiments.

In addition, functional units in each embodiment of the present disclosure may be integrated into one processing unit, or each unit may have separate physical existence, or two or more units may be integrated in one unit.

Those of ordinary skills in the art can understand that some or all processes of the realization of the foregoing method in the embodiments can be implemented by controlling relevant hardware by the computer program. The foregoing program may be stored on a computer-readable storage medium, where when the program is executed, the processes of the embodiments of the foregoing methods can be included. The foregoing storage medium may be a magnetic disk, an optical disc, a read-only memory (ROM), a random access memory (RAM), or the like.

It may be understood that the embodiments described in the embodiments of the present disclosure may be implemented by hardware, software, firmware, middleware, microcode, or a combination thereof. For hardware implementation, a unit, a module, a unit, or a subunit may be implemented in one or more application specific integrated circuits (ASIC), digital signal processors (DSP), digital signal processing devices (DSPD), programmable logic devices (PLD), field-programmable gate arrays (FPGA), general purpose processors, controllers, microcontrollers, microprocessors, or other electronic units or a combination thereof used to perform the functions in the present disclosure.

For software implementation, the technology described in the embodiments of the present disclosure may be implemented by using a module (for example, a process or a function) that performs the function in the embodiments of the present disclosure. Software codes can be stored in the memory and executed by the processor. The memory may be implemented inside or outside the processor.

Although the present disclosure has been described with reference to the preferred embodiments, various improvements may be made to the present disclosure without departing from the scope of the present disclosure and parts thereof may be replaced with equivalents. In particular, as long as there is no structural conflict, the various technical features mentioned in the embodiments can be combined in any manner. The present disclosure is not limited to the specific embodiments disclosed herein, but includes all technical solutions falling within the scope of the claims.

What is claimed is:

1. A wearable device comprising:
 a dial, wherein the dial is provided with a receiving groove;
 a watch body, at least partially arranged in the receiving groove and rotatably connected to the dial, wherein the watch body is provided with a functional component; and
 a position detection member, comprising a first component and a second component, wherein one of the first component and the second component is arranged on the dial, the other of the first component and the second component is arranged on the watch body, the first component comprises a first subcomponent and a second subcomponent, and the first subcomponent and the second subcomponent are spaced from each other in a rotation direction of the watch body; wherein
 the position detection member has a first state and a second state, when the position detection member is in the first state, the first subcomponent is opposite to the second component, and when the position detection member is in the second state, the second subcomponent is opposite to the second component;
 wherein the second component further comprises a mounting body, and the mounting body is connected to and protrudes from one of the watch body and the dial; and the mounting body has a first surface and a second surface, the first surface and the second surface are disposed opposite to each other, and one of a conductive component, a contact, and a metal plate is installed on the first surface and the second surface.

2. The wearable device according to claim 1, wherein the first component is arranged at intervals along a first pitch circle, the second component is arranged along a second pitch circle, and the first pitch circle and the second pitch circle have a same center.

3. The wearable device according to claim 1, wherein the first subcomponent, the second subcomponent, and the second component are all metal plate structures; and
 when the position detection member is in the first state, the first subcomponent is opposite to the second component to form a first parallel plate capacitor, when the position detection member is in the second state, the second subcomponent is opposite to the second component to form a second parallel plate capacitor, and the capacitance of the first parallel plate capacitor is different from the capacitance of the second parallel plate capacitor.

4. The wearable device according to claim 1, wherein the first component is a conductive component, the second component comprises a contact, the first subcomponent comprises a first conductive subcomponent, the second subcomponent comprises a second conductive subcomponent, when the position detection member is in the first state, the first conductive subcomponent is electrically connected to the contact, and when the position detection member is in the second state, the second conductive subcomponent is electrically connected to the contact.

5. The wearable device according to claim 4, wherein the contact comprises a first sub-contact located on the first surface and a second sub-contact located on the second surface; and
 when the position detection member is in the first state, the first conductive subcomponent is electrically connected to the first sub-contact, and when the position detection member is in the second state, the second conductive subcomponent is electrically connected to the second sub-contact.

6. The wearable device according to claim 5, wherein the first subcomponent further comprises a first trigger block, the first conductive subcomponent is disposed on the first trigger block, and the second subcomponent further comprises a second trigger block, and the second conductive subcomponent is disposed on the second trigger block;
 when the first component is provided on the dial and the mounting body is provided on the watch body, the first trigger block and the second trigger block protrude from the dial; and
 when the first component is disposed on the watch body and the mounting body is disposed on the dial, the first trigger block and the second trigger block protrude from the watch body.

7. The wearable device according to claim 1, wherein the first component comprises contacts, the second component comprises a conductive component, the first subcomponent comprises a first sub-contact, the second subcomponent comprises a second sub-contact, when the position detection member is in the first state, the first sub-contact is electrically connected to the conductive component, and when the position detection member is in the second state, the second sub-contact is electrically connected to the conductive component.

8. The wearable device according to claim 7, wherein the conductive component comprises a first conductive subcomponent located on the first surface and a second conductive subcomponent located on the second surface; and
when the position detection member is in the first state, the first conductive subcomponent is electrically connected to the first sub-contact, and when the position detection member is in the second state, the second conductive subcomponent is electrically connected to the second sub-contact.

9. The wearable device according to claim 4, wherein the resistance value of the first conductive subcomponent is different from the resistance value of the second conductive subcomponent.

10. The wearable device according to claim 1, wherein one of the dial and the watch body further comprises a limiting ball and an elastic member that abut against each other, the other one of the dial and the watch body is provided with a limiting slot, and when the limiting ball is at least partially located in the limiting slot, the dial and the watch body are clamped by the limiting ball and the limiting slot.

11. The wearable device according to claim 10, wherein the number of limiting slots is more than two, and the more than two limiting slots are spaced from each other along the rotation direction of the watch body.

12. The wearable device according to claim 10, wherein the dial comprises the limiting ball and the elastic member, a side of the watch body facing the dial is provided with the limiting slot, the dial is further provided with a mounting slot, the elastic member is slidably connected to the mounting slot, and the elastic member is at least partially located in the mounting slot;
when the mounting slot and the limiting slot are not opposite to each other, the elastic member is elastically deformed; and
when the mounting slot is opposite to the limiting slot, the elastic member recovers elastically, and the limiting ball is at least partially located in the limiting slot.

13. The wearable device according to claim 12, wherein the size of the opening of the mounting slot is smaller than the diameter of the limiting ball, and the limiting ball is located between the watch body and the elastic member.

14. The wearable device according to claim 1, wherein the wearable device further comprises:
a rotating connecting piece, wherein the dial and the watch body are rotatably connected through the rotating connecting piece, the rotating connecting piece comprises a rotating guide rail and a guide component, the rotating guide rail and the guide component cooperate with each other, one of the rotating guide rail and the guide component is arranged on the dial, and the other of the rotating guide rail and the guide component is arranged on the watch body.

15. A display method, performed by the wearable device according to claim 1, wherein the watch body is provided with a display screen and a camera component, and the method comprises:
receiving first position information of the position detection member; and
controlling a display direction of a display interface of the display screen according to the first position information.

16. The method according to claim 15, wherein the controlling a display direction of a display interface of the display screen according to the first position information comprises:
determining a rotation angle and a rotation direction between the watch body and the dial according to the first position information; and
adjusting the display direction of the display interface to an initial display direction according to the rotation angle and the rotation direction;
wherein the initial display direction is a display direction of the display interface of the display screen when the rotation angle between the watch body and the dial is 0°.

17. The method according to claim 16, further comprising:
adjusting a performance parameter of the camera component according to the rotation angle and/or the rotation direction, wherein the performance parameter comprises at least one of resolution, focal length, definition, or contrast.

18. The method according to claim 17, wherein the adjusting a performance parameter of the camera component according to the rotation angle and/or the rotation direction specifically comprises:
determining a shooting mode of the camera component according to the rotation angle and/or the rotation direction;
obtaining a parameter value of the performance parameter in the shooting mode; and
adjusting the camera component according to the parameter value.

19. The method according to claim 16, further comprising:
adjusting a display parameter of the display screen according to the rotation angle and/or the rotation direction, wherein the display parameter comprises at least one of brightness, contrast, resolution, hue, or a size of the display interface.

20. A wearable device comprising: a processor, a memory, and a computer program stored in the memory and executable on the processor, wherein the computer program, when executed by the processor, causes the wearable device to perform the display method according to claim 15.

* * * * *